(12) United States Patent
Malcolm

(10) Patent No.: US 6,798,885 B1
(45) Date of Patent: Sep. 28, 2004

(54) METHOD AND APPARATUS FOR ENCODING SECURITY INFORMATION IN A MIDI DATASTREAM

(75) Inventor: Jerry Walter Malcolm, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/303,354

(22) Filed: Apr. 29, 1999

(51) Int. Cl.[7] .............................. H04L 9/00; H04N 7/167
(52) U.S. Cl. ........................ 380/42; 380/37; 380/201; 713/176; 713/178; 713/200
(58) Field of Search .......................... 713/178; 380/42, 380/37, 36, 201

(56) References Cited

U.S. PATENT DOCUMENTS

| | | | | |
|---|---|---|---|---|
| 4,942,551 A | * | 7/1990 | Klappert et al. ............... 710/65 |
| 5,187,352 A | * | 2/1993 | Blair et al. .................. 235/382 |
| 5,275,082 A | * | 1/1994 | Kestner-Clifton et al. 84/477 B |
| 5,321,200 A | | 6/1994 | Yamamoto |
| 5,416,526 A | | 5/1995 | Yamamoto |
| 5,518,408 A | * | 5/1996 | Kawashima et al. .... 434/307 A |
| 5,640,590 A | | 6/1997 | Luther |
| 5,737,491 A | | 4/1998 | Allen et al. |
| 5,883,957 A | * | 3/1999 | Moline et al. ................. 705/57 |
| 5,902,949 A | * | 5/1999 | Mohrbacher ................. 84/609 |
| 6,011,849 A | * | 1/2000 | Orrin .......................... 380/42 |
| 6,121,536 A | * | 9/2000 | Malcolm ..................... 84/645 |
| 6,449,661 B1 | * | 9/2002 | Fujishima ...................... 710/5 |

* cited by examiner

*Primary Examiner*—Gilberto Barrón
*Assistant Examiner*—Kambiz Zand
(74) *Attorney, Agent, or Firm*—Morgan & Finnegan, LLP; Joseph C. Redmond, Jr.

(57) ABSTRACT

The present invention is apparatus and method for encoding, decoding, and encoding and decoding security information in a Musical Instrument Digital Interface (MIDI). In order to perform encoding, musical information and security information are received. The musical information is encoded to generate a plurality of MIDI events. The security information is encoded to generate a plurality of MIDI events of a selected standard type of MIDI event, the generated MIDI events being overrun events that have no effect on a musical output. The generated MIDI events are transmitted. In order to perform decoding, the transmitted MIDI events are received. The plurality of MIDI events encoding security information are detected among the received MIDI events and the plurality of MIDI events encoding security information are decoded to recover the security information.

45 Claims, 8 Drawing Sheets

Fig. 2a

| STATUS D7---D0 CHANNEL VOICE MESSAGES: | # OF DATA BYTES | DESCRIPTION |
|---|---|---|
| 1000NNNN | 2 | NOTE OFF EVENT |
| 1001NNNN | 2 | NOTE ON EVENT (VELOCITY=0: NOTE OFF) |
| 1010NNNN | 2 | POLYPHONIC KEY PRESSURE/AFTER TOUCH |
| 1011NNNN | 2 | CONTROL CHANGE |
| 1100NNNN | 1 | PROGRAM CHANGE |
| 1101NNNN | 1 | CHANNEL PRESSURE/AFTER TOUCH |
| 1110NNNN | 2 | PITCH BEND CHANGE |
| 11110000 | ***** | SYSTEM EXCLUSIVE |
| 11110SSS | 0 TO 2 | SYSTEM COMMON |
| 11111TTT | 0 | SYSTEM REAL TIME |

Fig. 2b

| META EVENTS | DESCRIPTION |
|---|---|
| FF 01 | TEXT |
| FF 02 | COPYRIGHT NOTICE |
| FF 03 | SEQUENCE/TRACK NAME |
| FF 04 | INSTRUMENT NAME |
| FF 05 | LYRIC |
| FF 06 | MARKER |
| FF 07 | CUE POINT |

PRIOR ART

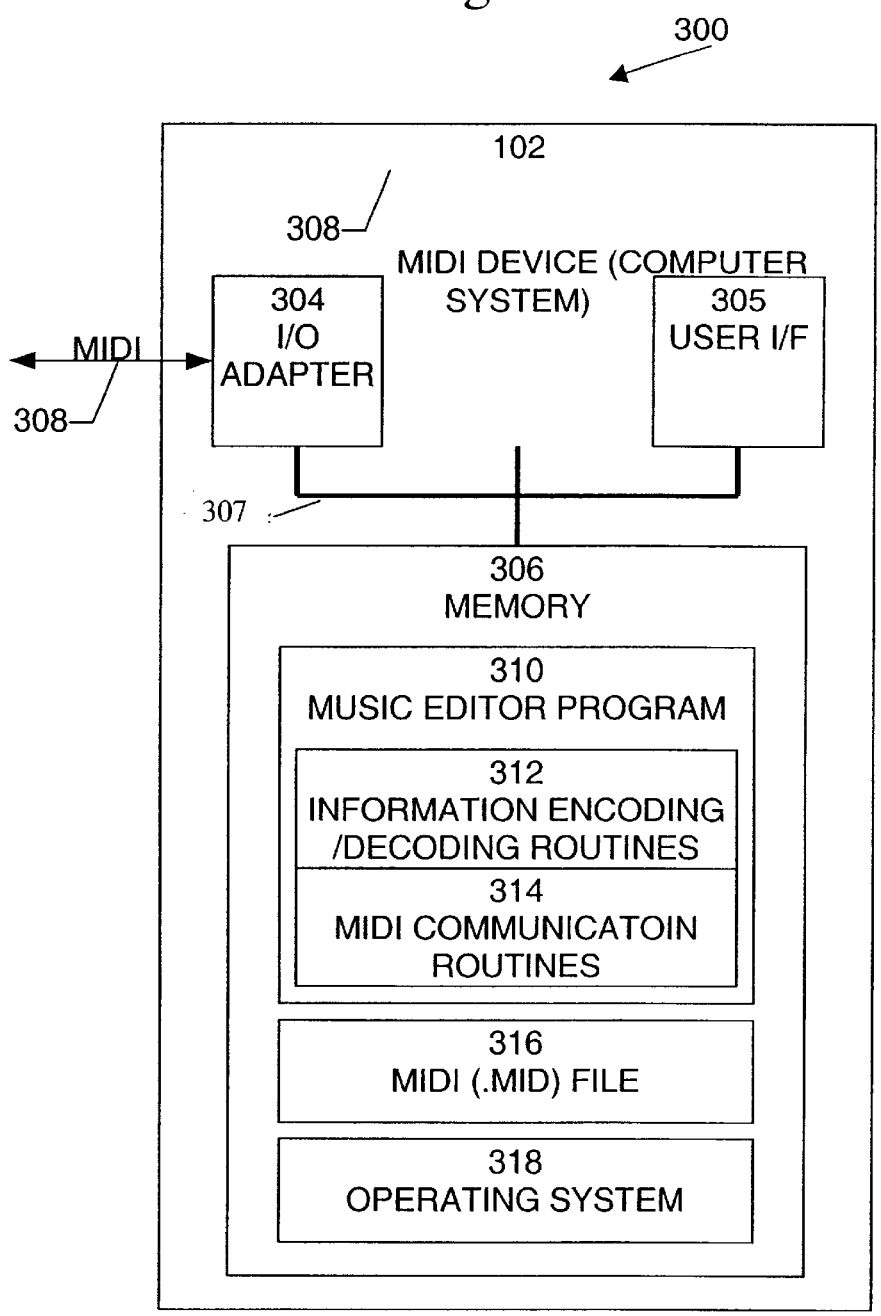

METHOD AND APPARATUS FOR ENCODING SECURITY INFORMATION IN A MIDI DATASTREAM

FIELD OF THE INVENTION

The present invention relates to a method and apparatus for encoding private information in a MIDI datastream.

BACKGROUND OF THE INVENTION

The Musical Instrument Digital Interface (MIDI) is a protocol used to transmit musical instructions to a musical device or instrument that is capable of converting the instructions into musical sounds. MIDI is becoming increasingly popular for distribution of music. Songs and accompaniment tracks are being sold in MIDI form, as well as on cassettes and compact disks. As with any form of electronic information, such as software, audio music, or MIDI music, the potential for financial loss due to piracy is a significant problem.

Historically, the software industry has employed many techniques to discourage piracy of software. For example, one such technique involves requiring a user to enter information, such as a key or serial number, at the time the software is installed. However, the music industry has done little to address the problem of piracy other than to take legal action against major distributors of pirated music.

A simple technique to provide anti-piracy security in MIDI information is to include security information, such as a serial number or other copyright and/or trademark information, in MIDI text events included in the MIDI information. Such security information is easy to add to the MIDI information and would provide the capability of tracking the original owner should pirated copies appear on the market. However, a problem arises in that information in MIDI text events would be very easy to locate and alter or remove from the MIDI information. A need arises for a technique by which security information which may easily be included in MIDI information, yet which is difficult to locate and alter or remove.

SUMMARY OF THE INVENTION

The present invention is apparatus and method for encoding, decoding, and encoding and decoding security information in a Musical Instrument Digital Interface (MIDI). In order perform encoding, musical information and security information are received. The musical information is encoded to generate a plurality of MIDI events. The security information is encoded to generate a plurality of MIDI events of a selected standard type of MIDI event, the generated MIDI events being overrun events that have no effect on a musical output. The generated MIDI events are transmitted.

In order to perform decoding, the transmitted MIDI events are received. The plurality of MIDI events encoding security information are detected among the received MIDI events and the plurality of MIDI events encoding security information are decoded to recover the security information.

BRIEF DESCRIPTION OF THE DRAWINGS

The details of the present invention, both as to its structure and operation, can best be understood by referring to the accompanying drawings, in which like reference numbers and designations refer to like elements.

FIG. 2 is an exemplary format of MIDI events.

FIG. 3 is a block diagram of an exemplary MIDI device shown in FIG. 1.

DETAILED DESCRIPTION OF THE INVENTION

Figure 1:
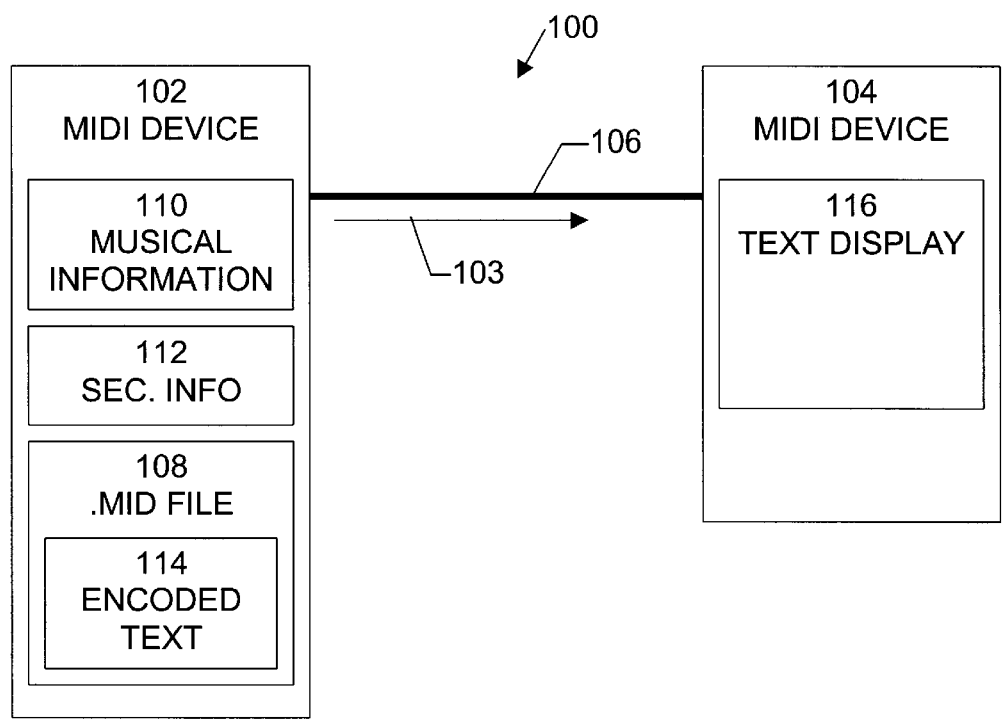
FIG. 1 shows a system including MIDI devices, according to the present invention.

An exemplary MIDI system 100, according to the present invention, is shown in FIG. 1. A MIDI device 102 outputs a MIDI datastream 103 to MIDI device 104 over MIDI cable 106. The MIDI devices 102 and 104 may be any of a number of well-known devices, such as keyboards, synthesizers, synchronizers, computer systems, etc. If the device, for example, device 102, is a personal computer, the device may store one or more files containing MIDI data. Typically, files containing MIDI data are in a Standard MIDI File (*.mid) format, such as file 108. File 108 is generated by entering musical information 110 and security information 112 such as copyright, trademark, serial number or other information, into MIDI device 102. The musical information 110 is converted into MIDI event information and the other information 112 is encoded into MIDI event information 114 included in MIDI file 108. MIDI file 108 is transmitted to MIDI device 104 as MIDI datastream 103. MIDI device 104 receives MIDI datastream 103 and generates musical output based on the datastream. If the encoded information is public text information, MIDI device 104 also decodes the encoded information included in the datastream and displays the text on text display device 116.

MIDI is an event-based protocol. The MIDI events relate to changes in music being output by the various MIDI devices. A MIDI datastream comprises a sequence of specifications of such events. As MIDI events relate to music, it is important that each event be performed at the correct time. Therefore, all MIDI events include a timestamp indicating the time in the musical performance that the event is to be performed. The timestamp of an event represents the time difference between that event and the previous event, rather than the absolute time at which the event is to be performed. The actual time at which an event is to be performed is calculated by adding the time difference to the time at which the previous event was performed. The timestamp is in the form "measure:beat:tick". Tick resolution is typically $\frac{1}{120}$th of a quarter note.

The MIDI standard defines a number of types of events, as shown in FIG. 2a. These events control changes in the music being output by the MIDI device. As shown, there are 8 major event types in MIDI: Note On, Note Off, Key aftertouch, Control Change (commonly known as a controller event), Program or Patch Change (instrument selection), Channel aftertouch, Pitch Bend Change (Pitchwheel), and System events. Note on/off controls the start and stop of actual notes. Key aftertouch, controller, channel aftertouch, and pitchwheel affect the playing of the notes that are currently playing. System events are usually setup or meta events. Patch change events change the instrument that will be used to play the notes.

In addition to the events shown in FIG. 2a, the MIDI standard defines a number of other events, for example, the meta-events shown in FIG. 2b. Meta events 01 through 0F, are reserved for various types of text events, each of which is used to transmit text, but which is used for a different purpose, as described in Table A.

TABLE A

| META EVENTS | DESCRIPTION |
|---|---|
| TEXT | General text event, can be any text. |
| COPYRIGHT NOTICE | Contains a copyright notice as printable ASCII text. |
| SEQUENCE/ TRACK NAME | If in a format 0 track, or the first track in a format 1 file, the name of the sequence. Otherwise, the name of the track. |
| INSTRUMENT NAME | A description of the type of instrumentation to be used in that track. |
| LYRIC | A lyric to be sung. |
| MARKER | Normally in a format 0 track, or the first track in a format 1 file. The name of that point in the sequence, such as a rehearsal letter or section name ("First Verse", etc.). |
| CUE POINT | A description of something happening on a film or video screen or stage at that point in the musical score ("Car crashes into house", "curtain opens", "she slaps his face", etc.) |

In this documents, all events that transmit text that are defined in the MIDI standard, including the above-described events, and any others defined in the MIDI standard, are termed "standard MIDI text events."

Some of the events, such as Note On and Note Off, cause changes in the music being output whenever such events occur. However, some events do not always cause changes in the musical output. For example, if a series of controller events occurs when no notes are playing, only the last event in the series will have an effect on the musical output, and then not until at least one note starts playing.

The present invention uses MIDI events that have no effect on the musical output to encode messages and transmit the messages to MIDI devices. Any event from the set of events above that affect the playing of the current notes may be used to encode the information according to the present invention. They do not make notes play, they only affect the notes that are playing. They also typically appear in a series of incrementing or decrementing values to provide an 'envelope' of change such as crescendo or decrescendo of volume, or perhaps a moving pan of the sound from left channel to right channel over a period of time. These are all events that typically have overrun before and after the beginning and ending of the playing of notes. Overrun occurs because the well-known editing tools that are available allow you to draw,an envelope, but generate a plurality of discrete events. Further, if no note is playing, it doesn't hurt to have a few extra events, such as 'volume change' events before the note starts playing.

In this document, controller events are used as an example, but other events may be used as well.

Controller events are a class of MIDI events that are used to set MIDI device-specific controls. There are 128 different possible controller events. Each controller event has a controller identifier that identifies the event as one of the 128 types and a value that ranges from 0 to 127. The MIDI specification defines approximately 25 of the 128 possible controller event types. For example, controller 7 is volume, controller 64 is the sustain pedal, controller 10 is left/right pan, etc. The approximately 100 undefined controller events are available for use by musical instruments. A musical instrument may define if and how it interprets a particular controller event.

The present invention uses standard MIDI events to encode security information that is to be hidden in the MIDI datastream. Information encoded so that it is hidden is termed private or hidden information. Private information is encoded in controller events in such a way that musical instruments do not detect that the information is present and do not interpret or use the information. Security information, such as copyright, trademark, or other information, may be encoded as private information in a MIDI datastream. Private information is not only not decodable by any other user or musical instrument, but preferably, other users or musical instruments cannot even detect the presence of private information.

Private security information may be encoded in several places in the MIDI datastream that represents each piece of music. The private security information is completely transparent to the musical representation of the song and is also hidden to someone wishing to remove or change the security information.

Figure 8:
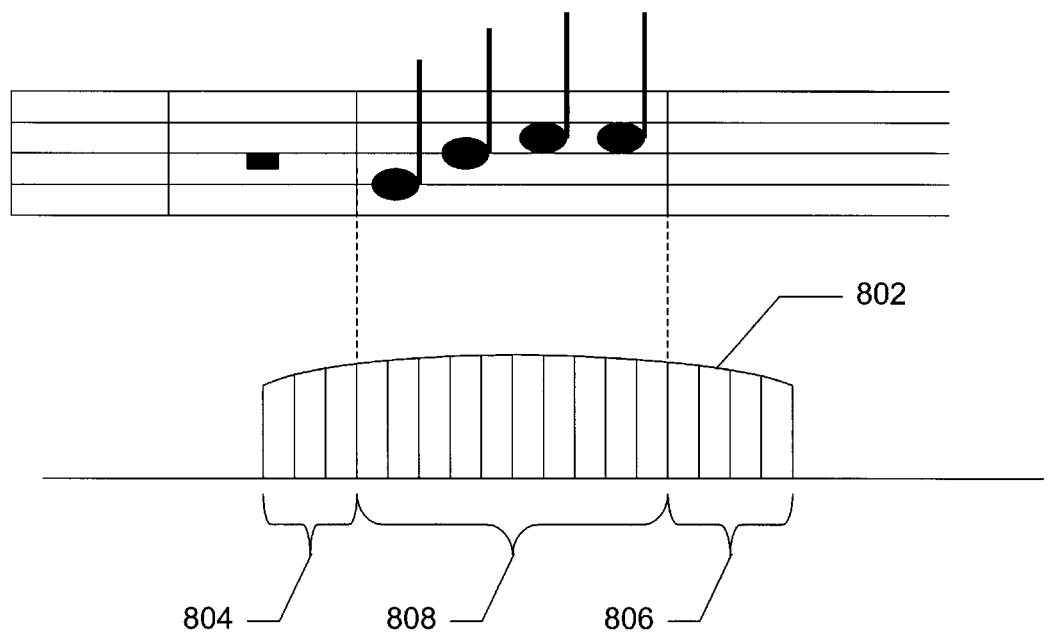
FIG. 8 is an example of a controller event envelope including overrun events.

As shown in FIG. 8 a program, such as MIDI editor software, allows a user to define envelopes 802 of controller events for any controller. A MIDI datastream output from such a program may include controller events before notes start 804, or after notes finish 806, in addition to controller events while notes are playing 808. Controller events that occur before notes start 804 or after notes finish 806 are termed overrun events and have no effect on the music that is played by a musical instrument. In the present invention, the controller events that are used to encode private information are transmitted as overrun events and are standard, commonly used events. Musical instruments that receive such events will interpret them as standard controller events, rather than as encoded private information. The presence of controller events that encode private information is masked by secreting such events among the large number of other controller events that are present anyway.

An exemplary computer system 104 that generates MIDI files including encoded private information, according to the present invention, is shown in FIG. 3. System 300 includes central processing unit (CPU) 302, which is connected to input/output (I/O) adapter 304, user interface 305 and memory 306. I/O adapter 302 couples system 300 to other MIDI devices connected to MIDI bus 308, allowing MIDI data communications with those MIDI devices. I/O adapter 302 includes well-known standard MIDI interface circuitry. User interface 305 accepts input from a user and displays output generated by system 300 to the user. User interface 305 typically includes a mouse, keyboard and monitor, but may also include other devices, such as a graphics tablet, trackpad, trackball, scanner, printer, etc.

Memory 306 is accessible by CPU 304 and stores program instructions executed by CPU 304 and data used during program execution. Memory 306 typically includes devices such as random-access memory (RAM), read-only memory (ROM), programmable read-only memory (PROM), erasable programmable read-only memory (EPROM), electrically erasable programmable read-only memory (EEPROM), and storage devices, such as hard disk drives, floppy disk drives, tape drives, optical drives, etc.

Memory 306 includes music program 310, information encoding/decoding routines 312, MIDI communication routines 314, MIDI file 316, and operating system 318. Music editor program 310 allows a user to enter and edit musical notation and other information, such as security information, and to control MIDI devices to play music based on the entered musical notation. Information encoding/decoding routines 312 and MIDI communication routines 314 are typically included in music editor program 310. Information encoding/decoding routines 312 encode private information into a MIDI datastream and decode private information from a MIDI data stream. MIDI communication routines 314 control the transmission and reception of MIDI data from MIDI devices connected to MIDI bus 308.

Figure 4:
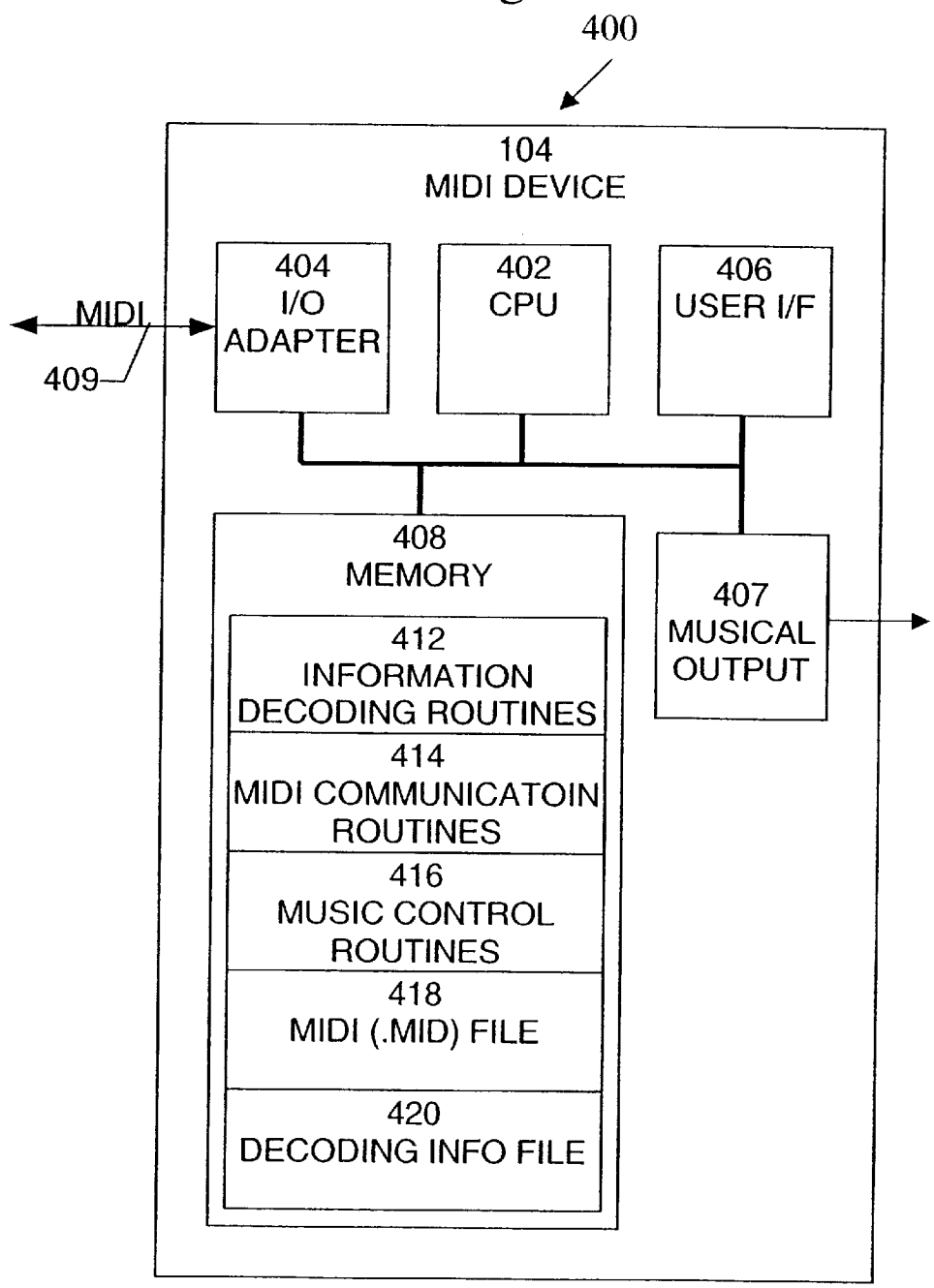
FIG. 4 is a block diagram of another exemplary MIDI device also shown in FIG. 1.

An exemplary MIDI device 104 as shown in system 400 that decodes and displays MIDI data including encoded private information, according to the present invention, is shown in FIG. 4. Typically, device 104 is a computer system, but device 102 may be another type of electronic device, such as an electronic musical instrument. Device 104 includes central processing unit (CPU) 402, which is connected to input/output (I/O) adapter 404, user interface 406, memory 408 and may include musical output circuitry 409, such as a sound card or other circuitry. I/O adapter 402 couples system 400 to other MIDI devices connected to MIDI bus 409, allowing MIDI data communications with those MIDI devices. I/O adapter 402 includes well-known standard MIDI interface circuitry. User interface 406 accepts input from a user and displays output generated by system 400 to the user. User interface 406 typically includes devices such as a keyboard, drum pad, switches, sliders, etc., and a text display. Musical output circuitry 407 generates musical output signals based on the input MIDI datastream and/or user inputs.

Memory 408 is accessible by CPU 404 and stores program instructions executed by CPU 404 and data used during program execution. Memory 408 typically includes devices such as random-access memory (RAM), read-only memory (ROM), programmable read-only memory (PROM), erasable programmable read-only memory (EPROM), and electrically erasable programmable read-only memory (EEPROM), but may also include storage devices, such as hard disk drives, floppy disk drives, tape drives, optical drives, etc.

Memory 408 includes information decoding routines 412 and MIDI communication routines 414 and may include music control routines 416 and MIDI (mid) file 418. Music control routines 416 control musical output circuitry 409 in the generation of musical output signals based on the input MIDI datastream and/or user inputs. Information decoding routines 412 decode information encoded in a MIDI datastream received by device 104 or in one or more MIDI files 418 stored in memory 408. MIDI communication routines 414 control the transmission and reception of MIDI data from MIDI devices connected to MIDI bus 409.

Figure 5:
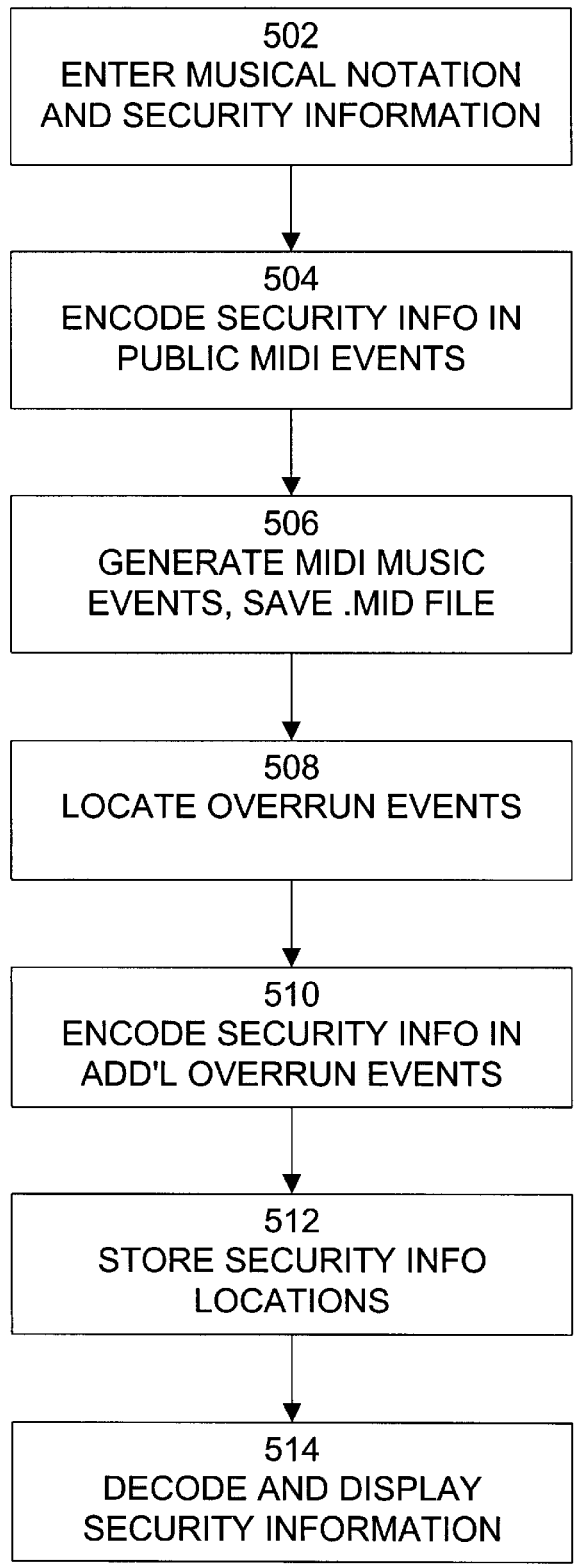
FIG. 5 is a flow diagram of a process of operation of the system shown in FIG. 1.

The system shown in FIG. 1 operates as shown in FIG. 5. In step 502, a user enters musical notation and security information, which is to be encoded, using music editor program 310. In step 504, music editor program 310 invokes encoding/decoding routines 312 to encode the entered security information as public information in MIDI events that are generally decodable. The events encoding the public security information are placed at several locations throughout the MIDI file. In step 506, music editor program 310 also uses the entered musical notation to generate MIDI musical events. The musical events and the encoded public events are combined to form a MIDI data file 316, which is saved in memory 306. In step 508, the MIDI data file including musical events and encoded public events is analyzed and locations of overrun events are determined. In step 510, the private security information is encoded in MIDI events appended to the overrunning musical events. The overrunning events that encode security information may be appended before the beginning of notes, after the end of notes, or both. Step 510 causes MIDI data file 316 to be modified to include the overrun events that encode private security information. In step 512, information identifying the locations of the encoded private security information is stored, along with information identifying the musical selection, in decoding information file 420. Decoding information is stored in file 420.

If it is suspected that the copy of a MIDI musical selection has been pirated, the suspect copy may be analyzed by decoding the private security information encoded in the selection, using decoding information file 420 in step 514. The security information encoded in the musical selection may include information identifying the date and owner of the copyright on the musical selection and/or information identifying the owner of any trademark on the musical selection. In addition, when MIDI musical selections are electronically distributed, the security information may also include information identifying the original and any subsequent legitimate purchasers of the musical selection. This would allow pirated copies to be traced back to their legitimate purchasers, making it easier to hold someone liable for the pirating.

Figure 6:
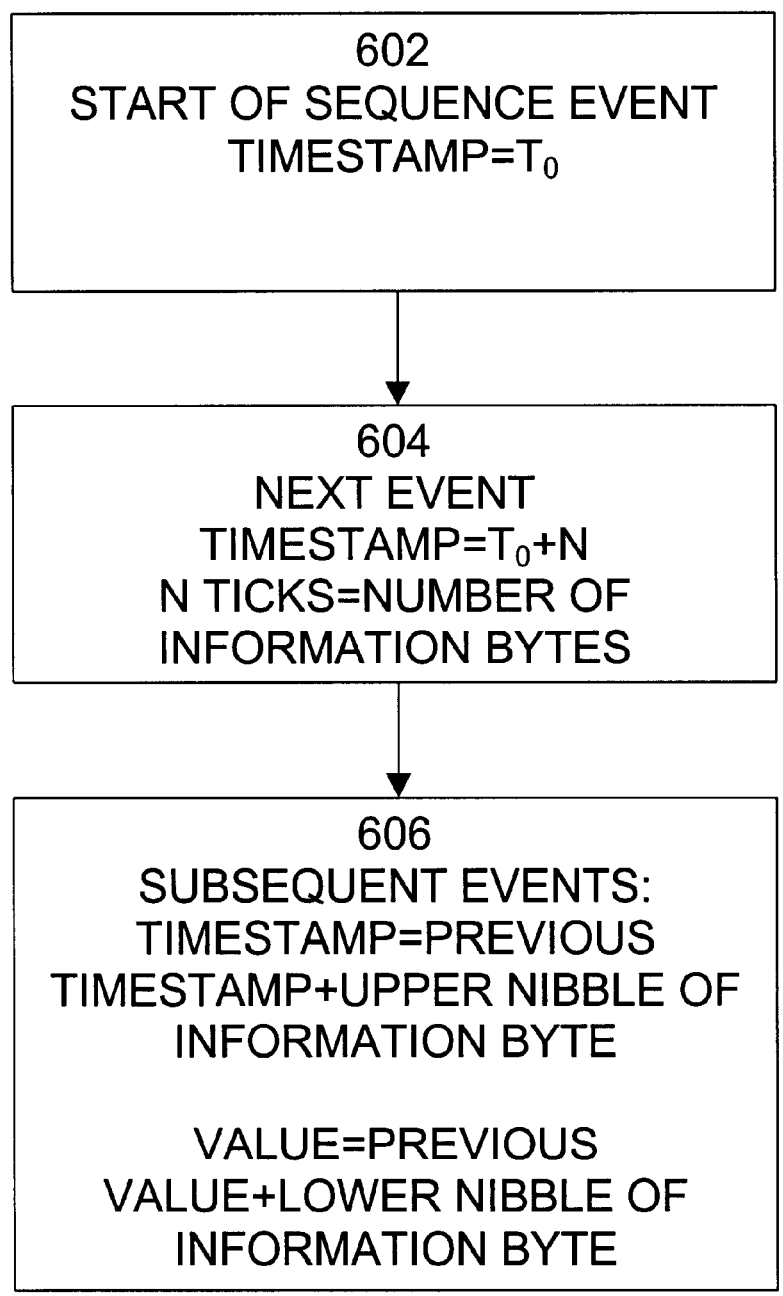
FIG. 6 is a flow diagram of an encoding process implemented in the device shown in FIG. 3.

An exemplary process in which private information is encoded into a MIDI datastream, according to the present invention, is shown in FIG. 6. In step 602, a start of sequence MIDI event is generated. The start of sequence event has starting timestamp denoted $T_0$. In step 604, a next MIDI event is generated. The next event has a timestamp equal to $T_0+N$ ticks, where N is equal to the number of bytes of information, such as text characters, that are to be encoded in the MIDI datastream. In step 606, N subsequent MIDI events, one per encoded information bytes, are generated. Each subsequent MIDI event has a timestamp equal to the timestamp of the previous MIDI event plus the upper nibble of the information byte being encoded by the MIDI event. Likewise, each subsequent MIDI event has a value equal to the value of the previous MIDI event plus the lower nibble of the information byte being encoded by the MIDI event.

Figure 7:
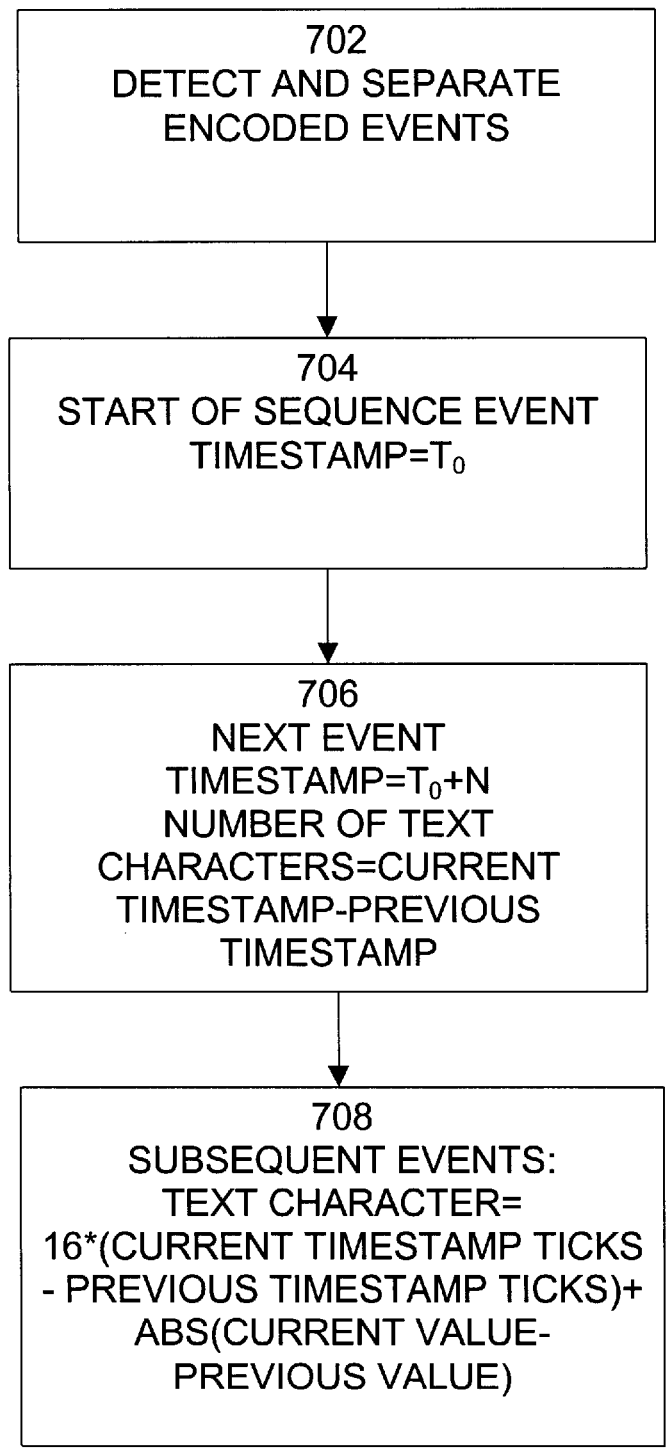
FIG. 7 is a flow diagram of a decoding process implemented in the devices shown in FIGS. 3 and 4.

An exemplary process in which a MIDI datastream, which includes private information encoded according to the process shown in FIG. 6, is decoded, according to the present invention, is shown in FIG. 7. In step 702, the receiving MIDI device scans for and detects MIDI events that encode private information. Privacy of the encoded private information is provided, in part by the requirement that additional information is needed in order to detect the encoded text sequences. For example, the starting and ending locations of the controller events that encode private text may be used to detect the relevant MIDI events. The controller events that encode private information cannot be detected by anyone without such information, so the encoded private information cannot be viewed, altered, or removed without authorization. The detected encoded events may be separated from the other events in the MIDI datastream, decoded, and used to verify the security information.

The other MIDI events may be used to control the musical performance of the MIDI device. In step 704, a start of sequence MIDI event is detected. The start of sequence event has starting timestamp denoted $T_0$. In step 706, a next MIDI event is detected. The next event has a timestamp equal to $T_0+N$ ticks, where N is equal to the number of information bytes that are encoded in the MIDI datastream. The number of encoded information bytes is determined by subtracting the previous timestamp value, which is the timestamp value of the start-of-sequence MIDI event, $T_0$, from the current timestamp value, which is the timestamp value of the next MIDI event, $T_0+N$, to yield N. In step 708, N subsequent MIDI events, one per encoded information byte, are detected. Each subsequent MIDI event has a timestamp equal to the timestamp of the previous MIDI event plus the upper nibble of the information byte being encoded by the MIDI event. Likewise, each subsequent MIDI event has a value equal to the value of the previous MIDI event plus the lower nibble of the information byte being encoded by the MIDI event. Thus, for each subsequent MIDI event, a decoded information byte is recovered according to the relation:

Information byte=16*(current timestamp ticks−previous timestamp ticks)+absolute value(current MIDI event value−previous MIDI event value).

It is important to note that while the present invention has been described in the context of a fully functioning data processing system, those of ordinary skill in the art will appreciate that the processes of the present invention are capable of being distributed in the form of a computer readable medium of instructions and a variety of forms ant that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An apparatus for decoding security information in a Musical Instrument Digital Interface (MIDI) datastream, comprising:

means for receiving a MIDI datastream comprising a plurality of MIDI events encoding security information, the MIDI events of a selected standard type of MIDI event in an envelope of controller events, the MIDI events being overrun events that take place before notes or after notes finish in the musical information and have no effect on a musical output;

means for detecting in the MIDI datastream the plurality of MIDI events; and means for decoding the plurality of MIDI events encoding security information to recover the security information wherein the type of MIDI event is selected from among a set of MIDI overrun event types consisting of: Key Aftertouch, controller, Program Change, Channel Aftertouch, Pitch Bend Change, and System events and wherein the detecting means comprises:

means for detecting the plurality of MIDI events encoding the security information using stored information identifying locations of the plurality of MIDI events and at least one of the plurality of MIDI events appended to a located overrun events.

2. The apparatus of claim 1, wherein the means for receiving a MIDI datastream comprises:

means for receiving a plurality of MIDI events encoding security information, the MIDI events of a selected non-standard type of MIDI event.

3. A method of encoding security information in a Musical Instrument Digital Interface (MIDI) datastream, comprising the steps of: receiving musical information; receiving security information; encoding the musical information to generate a plurality of MIDI events; encoding the security information to generate a plurality of MIDI events of a selected standard type of MIDI event, the generated MIDI events being overrun events that have no effect on a musical output, wherein the security information comprises a plurality of bytes having a number and the encoding step comprises the steps of:

generating a start sequence MIDI event having a first timestamp value;

generating a next MIDI event having a second timestamp value equal to the first timestamp value plus a number of ticks equal to the number of bytes of the security information; and generating a plurality of subsequent MIDI events, each subsequent MIDI event encoding one of the number of bytes; and wherein the step of encoding the security information comprises the step of:

locating an overrun event among the plurality of MIDI events encoding the musical information; encoding the security information in a plurality of MIDI events, at least one of the plurality of MIDI events encoding the security information appended to the located overrun event; and transmitting the generated MIDI events.

4. The method of claim 3, wherein the step of generating a plurality of subsequent MIDI events comprises the step of:

generating, for each of the number of bytes, a subsequent MIDI event having a timestamp value equal to a timestamp value of a previous MIDI event plus a number of ticks equal to a number represented by an upper nibble of the byte and having an event value equal to a previous event value plus a number of ticks equal to a number represented by a lower nibble of the byte.

5. A method of decoding security information in a Musical Instrument Digital Interface (MIDI) datastream, comprising the steps of:

receiving a MIDI datastream comprising a plurality of MIDI events encoding security information, the MIDI events of a selected standard type of MIDI event the MIDI events being overrun events that have no effect on a musical output;

detecting in the MIDI datastream the plurality of MIDI events wherein the detecting step comprises the steps of:

detecting the plurality of MIDI events encoding the security information using stored information identifying locations of the plurality of MIDI events and decoding the plurality of MIDI events encoding security information to recover the security information wherein the security information comprises a plurality of bytes having a number and the decoding step comprises the steps of:

detecting a start of sequence MIDI event having a first timestamp value;

detecting a next MIDI event having a second timestamp value generating the number of bytes of security information based on the first timestamp value minus the second timestamp value; and decoding a plurality of subsequent MIDI events, each subsequent MIDI event encoding one of the number of bytes of security information.

6. An apparatus for encoding security information in a Musical Instrument Digital Interface (MIDI) datastream, comprising:

means for receiving musical information;

means for receiving security information;

means for encoding the musical information to generate a plurality of MIDI events;

means for encoding the security information to generate a plurality of MIDI events of a selected standard type of MIDI event, the generated MIDI events being overrun events that have no effect on a musical output wherein the means for encoding the security information comprises the steps of:

means for locating an overrun event among the plurality of MIDI events encoding the musical information; and means for encoding the security information in a plurality of MIDI events, at least one of the plurality of MIDI events encoding the security information appended to the located overrun event; wherein the security information comprises a plurality of bytes having a number and the encoding means comprises:

means for generating a start of sequence MIDI event having a first timestamp value;

means for generating a next MIDI event having a second timestamp value equal to the first timestamp value plus a number of ticks equal to the number of bytes of the security information; and means for generating a plurality of subsequent MIDI events, each subsequent MIDI event encoding one of the number of bytes; and means for transmitting the generated MIDI events.

7. Apparatus for decoding security information in a Musical Instrument Digital Interface (MIDI) datastream, comprising:

means for receiving a MIDI datastream comprising a plurality of MIDI events encoding security information, the MIDI events of a selected standard type of MIDI event, the MIDI events being overrun events that have no effect on a musical output;

means for detecting in the MIDI datastream the plurality of MIDI events wherein the detecting means comprises:

means for detecting the plurality of MIDI events encoding the security information using stored information identifying locations of the plurality of MIDI events;

wherein the security information comprises a plurality of bytes having a number and the decoding means comprises:

means for detecting a start of sequence MIDI event having a first timestamp value;

means for detecting a next MIDI event having a second timestamp value means for generating the number of bytes of security information based on the first timestamp value minus the second timestamp value; and means for decoding a plurality of subsequent MIDI events, each subsequent MIDI event encoding one of the number of bytes of security information; and means for decoding the plurality of MIDI events encoding security information to recover the security information.

8. An apparatus for encoding and decoding security information in a Musical Instrument Digital Interface (MIDI), comprising:

means for receiving musical information;

means for receiving security information;

means for encoding the musical information to generate a plurality of MIDI events;

means for encoding the security information to generate a plurality of MIDI events of a selected standard type of MIDI event, the generated MIDI events being overrun events that have no effect on a musical output wherein the means for encoding the security information comprises:

means for locating an overrun event among the plurality of MIDI events encoding the musical information;

means for encoding the security information in a plurality of MIDI events, at least one of the plurality of MIDI events encoding the security information appended to the located overrun event; wherein the security information comprises a plurality of bytes having a number and:

the encoding means comprises:

means for generating a start of sequence MIDI event having a first timestamp value, means for generating a next MIDI event having a second timestamp value equal to the first timestamp value plus a number of ticks equal to the number of bytes of the security information, and means for generating a plurality of subsequent MIDI events, each subsequent MIDI event encoding one of the number of bytes; and the decoding means comprises:

means for detecting a start of sequence MIDI event having a first timestamp value, means for detecting a next MIDI event having a second timestamp value means for generating the number of bytes of security information based on the first timestamp value minus the second timestamp value, and means for decoding a plurality of subsequent MIDI events, each subsequent MIDI event encoding one of the number of bytes of security information;

means for transmitting the generated MIDI events;

means for receiving the transmitted MIDI events;

means for detecting among the received MIDI events the plurality of MIDI events encoding security information; and means for decoding the plurality of MIDI events encoding security information to recover the security information.

9. A method of encoding security information in a Musical Instrument Digital Interface (MIDI) datastream, comprising the steps of:

receiving musical information, as notes;

receiving security information;

encoding the musical information to generate a plurality of MIDI events;

encoding the security information to generate a plurality of MIDI events of a selected standard type of MIDI event in an envelope of controller events, the generated MIDI events being overrun events that take place before notes or after notes finish in the musical information and have no effect on a musical output;

transmitting the generated MIDI events wherein the step of encoding the security information comprises the steps of:

locating an overrun event among the plurality of MIDI events encoding the musical information; and encoding the security information in a plurality of MIDI events, at least one of the plurality of MIDI events encoding the security information appended to the located overrun event.

10. The method of claim 9, further comprising the step of: storing information identifying locations of the plurality of MIDI events encoding the security information.

11. The method of claim 9, further comprising the step of: encoding the security information to generate a plurality of MIDI events of a selected non-standard type of MIDI event.

12. The method of claim 9, wherein the type of the MIDI event is selected from among a set of MIDI event types consisting of: Key aftertouch, controller, Program Change, Channel Aftertouch, Pitch Bend Change, and System events.

13. A method of decoding security information in a Musical Instrument Digital Interface (MIDI) datastream, comprising the steps of:

receiving a MIDI datastream comprising a plurality of MIDI events encoding security information, the MIDI events of a selected standard type of MIDI event in an envelope of controller events, the MIDI events being overrun events that take place before notes or after notes finish in the musical information and have no effect on a musical output;

detecting in the MIDI datastream the plurality of MIDI events; and decoding the plurality of MIDI events encoding security information to recover the security information wherein the type of the MIDI event is selected from among a set of MIDI event types consisting of: Key aftertouch, controller, Program Change, Channel Aftertouch, Pitch Bend Change, and System events and wherein the step of decoding a plurality of subsequent MIDI events comprises the steps of:

generating, for each subsequent MIDI event, a byte of security information having an upper nibble equal to a timestamp value of the subsequent MIDI event minus the timestamp value of a previous MIDI event and having a lower nibble equal to an event value of the subsequent MIDI event minus an event value of the previous MIDI event.

14. The method of claim 13 wherein the detecting step comprises the steps of:

detecting the plurality of MIDI events encoding the security information using stored information identifying locations of the plurality of MIDI events.

15. The method of claim 13, wherein the step of receiving a MIDI datastream comprises the step of:

receiving a plurality of MIDI events encoding security information, the MIDI events of a selected non-standard type of MIDI event.

16. The method of claim 13, further comprising the steps of:

using at least some of the MIDI events in the MIDI datastream that do not encode security information to control a musical performance of a MIDI device.

17. A method of encoding and decoding security information in a Musical Instrument Digital Interface (MIDI), comprising the steps of:

receiving musical information;

receiving security information;

encoding the musical information to generate a plurality of MIDI events;

encoding the security information to generate a plurality of MIDI events of a selected standard type of MIDI event, the generated MIDI events being overrun events that take place before notes or after notes finish in the musical information and have no effect on a musical output;

transmitting the generated MIDI events;

receiving the transmitted MIDI events;

detecting among the received MIDI events the plurality of MIDI events encoding security information;

decoding the plurality of MIDI events encoding security information to recover the security information wherein the step of encoding the security information comprises the steps of:

locating an overrun event among the plurality of MIDI events encoding the musical information; and encoding the security information in a plurality of MIDI events, at least one of the plurality of MIDI events encoding the security information appended to the located overrun event.

18. The method of claim 17, further comprising the step of:

encoding the security information to generate a plurality of MIDI events of a selected non-standard type of MIDI event.

19. The method of claim 17, wherein the type of the MIDI event is selected from among a set of MIDI event types consisting of: Key aftertouch, controller, Program Change, Channel Aftertouch, Pitch Bend Change, and System events.

20. The method of claim 17, wherein the security information comprises a plurality of bytes having a number and the encoding step comprises the steps of:

generating a start of sequence MIDI event having a first timestamp value;

generating a next MIDI event having a second timestamp value equal to the first timestamp value plus a number of ticks equal to the number of bytes of the security information; and generating a plurality of subsequent MIDI events, each subsequent MIDI event encoding one of the number of bytes.

21. The method of claim 20, wherein the detecting step comprises the steps of:

detecting the plurality of MIDI events encoding the security information using stored information identifying locations of the plurality of MIDI events.

22. The method of claim 21 wherein the security information comprises a plurality of bytes having a number and the decoding step comprises the steps of:

detecting a start of sequence MIDI event having a first timestamp value;

detecting a next MIDI event having a second timestamp value generating the number of bytes of security information based on the first timestamp value minus the second timestamp value; and decoding a plurality of subsequent MIDI events, each subsequent MIDI event encoding one of the number of bytes of security information.

23. The method of claim 22, wherein the step of receiving the transmitted MIDI events comprises the step of:

receiving a plurality of MIDI events encoding security information, the MIDI events of a selected non-standard type of MIDI event.

24. The method of claim 23, wherein the step of decoding a plurality of subsequent MIDI events comprises the steps of:

generating, for each subsequent MIDI event, a byte of
security information having an upper nibble equal to a
timestamp value of the subsequent MIDI event minus
the timestamp value of a previous MIDI event and
having a lower nibble equal to an event value of the
subsequent MIDI event minus an event value of the
previous MIDI event.

25. An apparatus for encoding security information in a
Musical Instrument Digital Interface (MIDI) datastream,
comprising:
  means for receiving musical information;
  means for receiving security information;
  means for encoding the musical information to generate a
    plurality of MIDI events;
  means for encoding the security information to generate a
    plurality of MIDI events of a selected standard type of
    MIDI event in an envelope of controller events, the
    generated MIDI events being overrun events that take
    place before notes or after notes finish in the musical
    information and have no effect on a musical output;
  means for transmitting the generated MIDI events
    wherein the means for encoding the security information
    comprises the steps of:
  means for locating an overrun event among the plurality
    of MIDI events encoding the musical information; and
  means for encoding the security information in a plurality
    of MIDI events, at least one of the plurality of MIDI
    events encoding the security information appended to
    the located overrun event.

26. The apparatus of claim 25, further comprising:
  means for storing information identifying locations of the
    plurality of MIDI events encoding the security information.

27. The apparatus of claim 25, further comprising:
  means for encoding the security information to generate a
    plurality of MIDI events of a selected non-standard
    type of MIDI event.

28. An apparatus for encoding and decoding security
information in a Musical Instrument Digital Interface
(MIDI), comprising:
  means for receiving musical information;
  means for receiving security information;
  means for encoding the musical information to generate a
    plurality of MIDI events;
  means for encoding the security information to generate a
    plurality of MIDI events of a selected standard type of
    MIDI event in an envelope of controller events, the
    generated MIDI events being overrun events that take
    place before notes or after notes finish in the musical
    information and have no effect on a musical output;
  means for transmitting the generated MIDI events;
  means for receiving the transmitted MIDI events;
  means for detecting among the received MIDI events the
    plurality of MIDI events encoding security information;
  means for decoding the plurality of MIDI events encoding
    security information to recover the security information
    wherein the means for encoding the security information
    comprises:
  means for locating an overrun event among the plurality
    of MIDI events encoding the musical information; and
  means for encoding the security information in a plurality
    of MIDI events, at least one of the plurality of MIDI
    events encoding the security information appended to
    the located overrun event.

29. The apparatus of claim 28, further comprising:
  means for storing information identifying locations of the
    plurality of MIDI events encoding the security information.

30. The apparatus of claim 28, further comprising:
  means for encoding the security information to generate a
    plurality of MIDI events of a selected non-standard
    type of MIDI event.

31. A computer program product for operating an apparatus for encoding security information in a Musical Instrument Digital Interface (MIDI) datastream, comprising:
  a computer readable medium;
  computer program instructions, recorded on the computer
    readable medium, executable by a processor, for performing the steps of:
  receiving musical information;
  receiving security information;
  encoding the musical information to generate a plurality
    of MIDI events;
  encoding the security information to generate a plurality
    of MIDI events of a selected standard type of MIDI
    event in an envelope of controller events, the generated
    MIDI events being overrun events that take place
    before notes or after notes finish in the musical information and have no effect on a musical output;
  transmitting the generated MIDI events wherein the step
    of encoding the security information comprises the
    steps of:
  locating an overrun event among the plurality of MIDI
    events encoding the musical information; and
  encoding the security information in a plurality of MIDI
    events, at least one of the plurality of MIDI events
    encoding the security information appended to the
    located overrun event.

32. The computer program product of claim 31, further
comprising computer program instructions for performing
the step of:
  storing information identifying locations of the plurality
    of MIDI events encoding the security information.

33. The computer program product of claim 31, further
comprising computer program instructions for performing
the step of:
  encoding the security information to generate a plurality
    of MIDI events of a selected non-standard type of
    MIDI event.

34. The computer program product of claim 31, wherein
the security information comprises a plurality of bytes
having a number and the encoding step comprises the steps
of:
  generating a start of sequence MIDI event having a first
    timestamp value;
  generating a next MIDI event having a second timestamp
    value equal to the first timestamp value plus a number
    of ticks equal to the number of bytes of the security
    information; and
  generating a plurality of subsequent MIDI events, each
    subsequent MIDI event encoding one of the number of
    bytes.

35. A computer program product for operating an apparatus for decoding security information in a Musical Instrument Digital Interface (MIDI) datastream, comprising:
  a computer readable medium;
  computer program instructions, recorded on the computer
    readable medium, executable by a processor, for performing the steps of:

receiving a MIDI datastream comprising a plurality of MIDI events encoding security information, the MIDI events of a selected standard type of MIDI event in an envelope of controller events, the MIDI events being overrun events that take place before notes or after notes finish in the musical information and have no effect on a musical output;

detecting in the MIDI datastream the plurality of MIDI events; and decoding the plurality of MIDI events encoding security information to recover the security information wherein the detecting step comprises the steps of:

detecting the plurality of MIDI events encoding the security information using stored information identifying locations of the plurality of MIDI events.

36. The computer program product of claim 35, wherein the security information comprises a plurality of bytes having a number and the decoding step comprises the steps of:

detecting a start of sequence MIDI event having a first timestamp value;

detecting a next MIDI event having a second timestamp value generating the number of bytes of security information based on the first timestamp value minus the second timestamp value; and decoding a plurality of subsequent MIDI events, each subsequent MIDI event encoding one of the number of bytes of security information.

37. The computer program product of claim 35, wherein the step of receiving a MIDI datastream comprises the step of:

receiving a plurality of MIDI events encoding security information, the MIDI events of a selected non-standard type of MIDI event.

38. A computer program product for operating an apparatus for encoding and decoding security information in a Musical Instrument Digital Interface (MIDI) datastream, comprising:

a computer readable medium; computer program instructions, recorded on the computer readable medium, executable by a processor, for performing the step of:

receiving musical information;

receiving security information;

encoding the musical information to generate a plurality of MIDI events;

encoding the security information to generate a plurality of MIDI events of a selected standard type of MIDI event in an envelope of controller events, the generated MIDI events being overrun events take place before notes or after notes finish in the musical information and have no effect on a musical output; transmitting the generated MIDI events; receiving the transmitted MIDI events; detecting among the received MIDI events the plurality of MIDI events encoding security information; decoding the plurality of MIDI events encoding security information to recover the security information wherein the step of encoding the security information comprises the steps of: locating an overrun event among the plurality of MIDI events encoding the musical information; and encoding the security information in a plurality of MIDI events, at least one of the plurality of MIDI events encoding the security information appended to the located overrun event.

39. The computer program product of claim 38, further comprising computer program instructions for performing the step of:

storing information identifying locations of the plurality of MIDI events encoding the security information.

40. The computer program product of claim 38, further comprising computer program instructions for performing the step of:

encoding the security information to generate a plurality of MIDI events of a selected non-standard type of MIDI event.

41. The computer program product of claim 38, wherein the security information comprises a plurality of bytes having a number and:

the encoding step comprises the steps of:

generating a start of sequence MIDI event having a first timestamp value, generating a next MIDI event having a second timestamp value equal to the first timestamp value plus a number of ticks equal to the number of bytes of the security information; and generating a plurality of subsequent MIDI events, each subsequent MIDI event encoding one of the number of bytes; and the decoding step comprises the steps of:

detecting a start of sequence MIDI event having a first timestamp value;

detecting a next MIDI event having a second timestamp value generating the number of bytes of security information based on the first timestamp value minus the second timestamp value; and decoding a plurality of subsequent MIDI events, each subsequent MIDI event encoding one of the number of bytes of security information.

42. A Musical Instrument Digital Interface (MIDI) datastream encoding security information, the datastream generated by performing the steps of:

receiving musical information;

receiving security information;

generating a start of sequence event including a time stamp $T_0$;

encoding the musical information to generate a plurality of MIDI events, each event having a time stamp equal to $T_0$ plus N ticks, where N is equal to the number of bytes of information to be encoded in the data stream;

encoding the security information to generate a plurality of MIDI events of a selected standard type of MIDI event in an envelope of controller events, the generated MIDI events being overrun events that take place before notes or after notes finish in the musical information and have no effect on a musical output;

transmitting the generated MIDI events wherein the step of encoding the security information comprises the steps of:

locating an overrun event among the plurality of MIDI events encoding the musical information; and encoding the security information in a plurality of MIDI events, at least one of the plurality of MIDI events encoding the security information appended to the located overrun event.

43. The datastream of claim 42, generated by further performing the step of:

storing information identifying locations of the plurality of MIDI events encoding the security information.

44. The datastream of claim 42, generated by further performing the step of:

encoding the security information to generate a plurality of MIDI events of a selected non-standard type of MIDI event.

45. The datastream of claim 42, wherein the security information comprises a plurality of bytes having a number and the encoding step comprises the steps of:

generating a start of sequence MIDI event having a first timestamp value;

generating a next MIDI event having a second timestamp value equal to the first timestamp value plus a number of ticks equal to the number of bytes of the security information; and generating a plurality of subsequent MIDI events, each subsequent MIDI event encoding one of the number of bytes.

\* \* \* \* \*